United States Patent [19]

Sanderson et al.

[11] Patent Number: 5,818,445

[45] Date of Patent: Oct. 6, 1998

[54] METHOD AND SYSTEM FOR CREATING COMPUTER-PROGRAM-BASED APPLICATIONS WITH DEVELOPER SPECIFIED LOOK AND FEEL

[75] Inventors: Stephen M. Sanderson; Thomas J. Davidson, both of Austin, Tex.

[73] Assignee: Tandem Computers Incorporated, Cupertino, Calif.

[21] Appl. No.: 943,221

[22] Filed: Sep. 9, 1992

[51] Int. Cl.⁶ ........................................ G06F 9/44
[52] U.S. Cl. ............................. 345/334; 345/335
[58] Field of Search ....................... 395/100, 118, 395/155–161, 333, 334, 335; 345/418, 333, 334, 335

[56] References Cited

U.S. PATENT DOCUMENTS

| | | | |
|---|---|---|---|
| 4,498,142 | 2/1985 | Advani et al. | 364/900 |
| 4,536,840 | 8/1985 | Borta | 364/300 |
| 5,212,771 | 5/1993 | Gane et al. | 395/155 X |
| 5,220,675 | 6/1993 | Padawer et al. | 395/155 X |
| 5,222,211 | 6/1993 | Mueller et al. | 395/155 X |
| 5,235,679 | 8/1993 | Yoshizawa et al. | 395/155 X |
| 5,327,529 | 7/1994 | Fults et al. | 395/334 X |
| 5,603,034 | 2/1997 | Swanson | 395/333 X |

OTHER PUBLICATIONS

Macomtpsj Reference, 1990, pp. 203–245.
"Program Generators", Which Computer?, Oct. 1983, pp. 131, 133, 135.

*Primary Examiner*—Mark K. Zimmerman
*Attorney, Agent, or Firm*—Graham & James LLP

[57] ABSTRACT

An system and method for creating applications having look and feel providing dynamically extensible languages for describing application look and feel. Engines are provided for executing programs written in the languages, and methods for extending the languages by creating new language operators are also provided. Methods for joining modules of functionality to new operators allow display of, and interaction with, functionality to be expressed in the extensible languages. The engines and languages permit language operators and functionality modules to be dynamically loaded.

20 Claims, 7 Drawing Sheets

Microfiche Appendix Included
(11 Microfiche, 954 Pages)

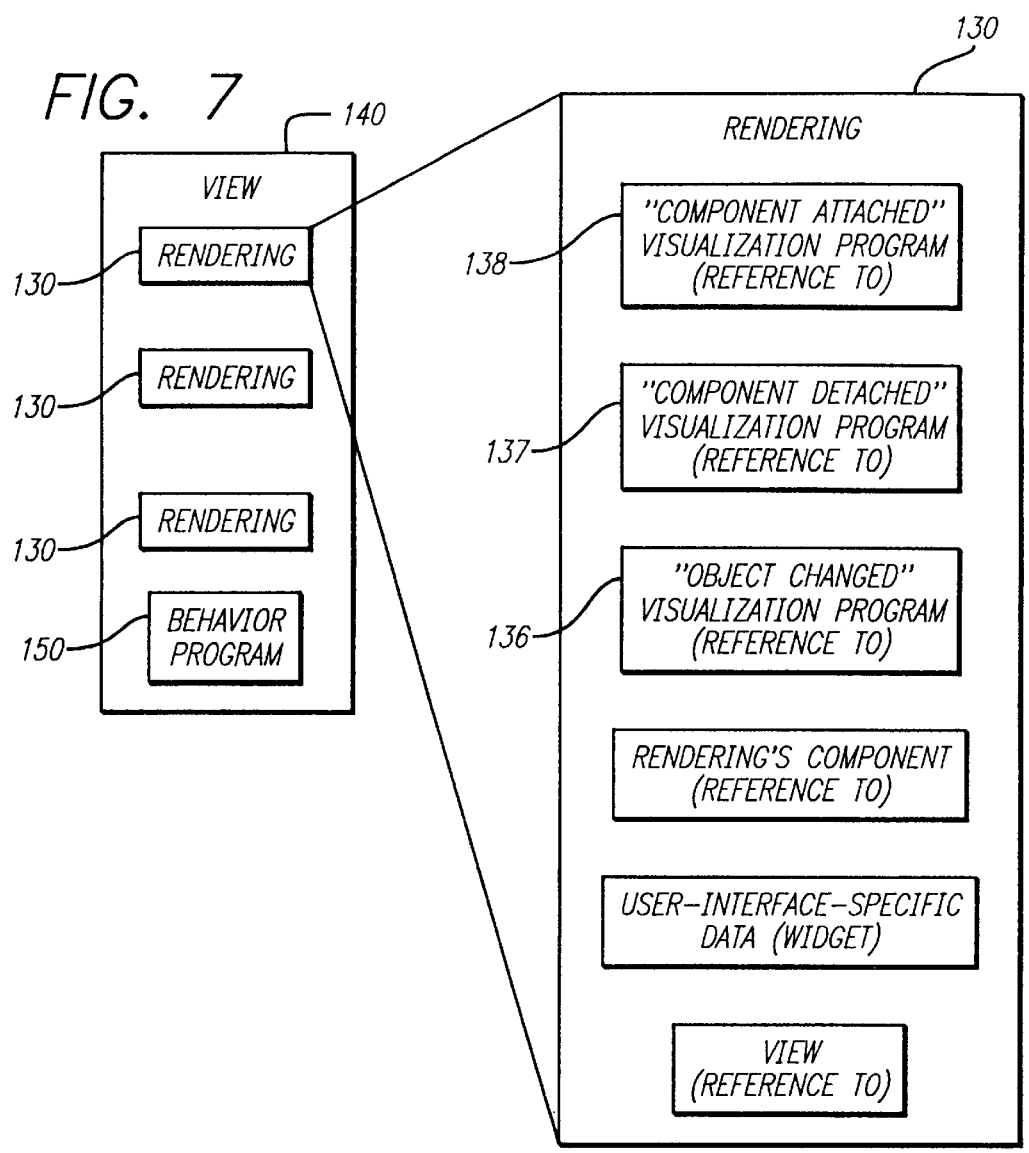
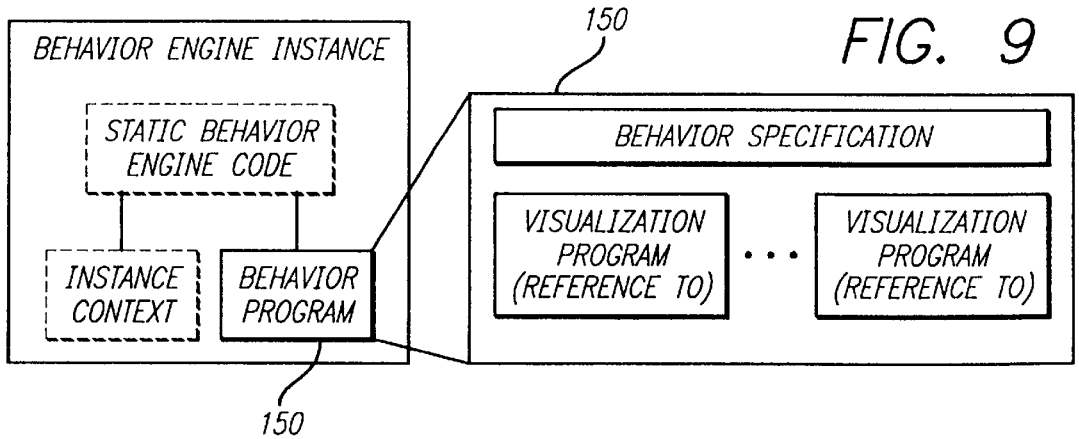

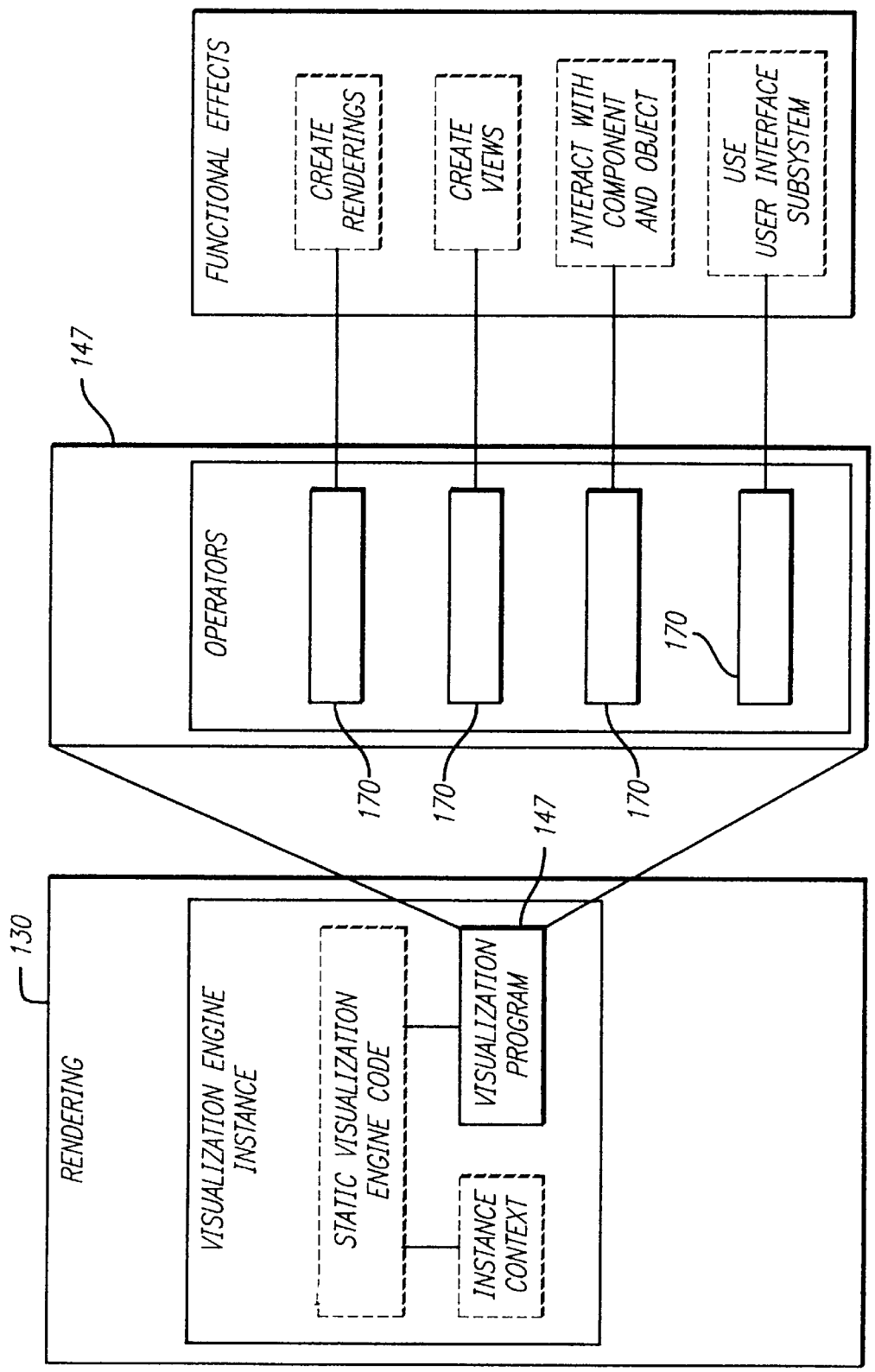

METHOD AND SYSTEM FOR CREATING COMPUTER-PROGRAM-BASED APPLICATIONS WITH DEVELOPER SPECIFIED LOOK AND FEEL

This application includes a microfiche appendix titled "Appendix A—Microfiche of Source Code for Extensible Framework", having ten (10) fiche with a total of 924 frames. This application also includes a microfiche appendix titled "Appendix B—Microfiche of Source Code for Extensible Framework, Working Example", having one (1) fiche with a total of 30 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to a system and method for creating computer-based end user applications, and more particularly to a system and method that operates to create interactive computer-based applications in which the appearance of the user interface and the behavior of the user interface is described, implemented and executed separately from the programming that implements the domain-specific portion of the application.

BACKGROUND OF THE INVENTION

Tools and methods for creating end-user computer application programs make a very important contribution to the marketability and usefulness of new computer technologies. Of particular interest are tools and methods for the design and implementation of interactive applications. Traditionally, the semantic behavior of a user interface, which may loosely be referred to as the "feel" of the application, was created using the same tools and languages used to create the body of the application. In such an approach, programming language source code is written, compiled and linked into an executable object code file that contains the design and implementation of all aspects of the application's user interface, as well as the programming that makes up the body of the application itself.

In an X windows environment, some aspects of the visual presentation, or "look", of the application may be separated from the feel and body of the application, and placed into a separate file, called a resource file. For example, in an application built with widgets one can change the color and shape of those widgets by changing the appropriate resource file. Typically, however, the existence of the widgets would not be changed when, as is conventionally done, that existence is hard coded into the application. While the separation of the look is advantageous for dealing with the variety of user interface devices and methods currently available, separating the implementation of an application's look and feel gives rise to a number of problems. First, the look and feel can be easily fall out of synchronization because application development and maintenance involves work in at least two files: the file containing the look and file containing the feel. Second, in a compilation environment, the edit-compile-link-debug cycle may become a substantial bottleneck in application development. Third, adding to or modifying the feel of an application is traditionally accomplished by modifying the source code of the application (again subjecting the developer to the edit-compile-link-debug cycle) and has the potential for introducing errors into the programming that implements the domain-specific body of the application program.

In view of the foregoing, there is a need for application development tools and methods that allow a clear distinction to be made between application specific (i.e., domain-specific) programming and user interface development. There is also a need for tools and methods that facilitate the creation of application-specific modules by developers having domain-specific expertise, but that do not require the developer also to have expertise in the design and development of user interfaces.

SUMMARY OF THE INVENTION

The present invention provides a computer-based system and method that are useful in the development of computer program-based applications. The invention is of particular interest to application developers, that is, to people who design, develop and implement application programs and systems. The invention allows a developer to describe the look of an application, and provides a module for processing and realizing the developer's description. The invention also allows the developer to describe the feel of an application, and similarly provides a module for processing and realizing the developer's description of the feel. Finally, the invention provides tools and methods for the developer to use to join application functionality to look and feel.

For the sake of brevity, the appearance of the user interface of an application is referred to in this specification as the "look" of the application, and the behavior of the user interface of an application is referred to in this specification as the "feel" of the application.

The invention provides languages for the developer to use in describing the look and the feel of an application. These languages, referred to as the visualization language and the behavior language, are interpretive languages. The descriptions created by the developer in these languages are, in fact, computer programs; and the modules that process and realize the programs are interpreters (as distinguished from compilers). Such programs will be referred to as visualization programs and behavior programs, respectively, and the modules that process them will be referred to as the visualization engine and the behavior engine, respectively.

The visualization language includes, as elements of the language, operators that enable the developer to describe the application's use of an interactive user interface device on the computer system on which the application is run. The visualization language also includes, as elements of the language, operators that enable the developer to describe the interaction of application look and feel with application functionality.

The developer may desire to create an application using functionality existing in computer programs developed independently of the invention. The invention therefore provides tools and methods for adapting pre-existing computer program modules for use with the visualization and behavior engines.

To join a module's functionality to the application's look and feel, the developer adds a small amount of computer program code to, or around, the pre-existing module, so that the modified module conforms to the minimal requirements of the invention. Such modified modules will be referred to in this specification as "objects".

Then, the developer creates "components". Components are abstract representations of objects; each component contains data and actions associated with its object. A component has no visualization associated with it, and if a component's object does have visualization, it is intended that that visualization be disregarded in the operation of the invention. The invention prescribes a structure for components so that they may interact with operators that are executed when a visualization program is interpreted by the visualization engine. One useful aspect of the invention is that the developer may create operators and add them to the visualization language thereby enabling the developer to augment the visualization language by creating operators matched to new components that can be used in a visualization program to enable the visualization program to interact with the new components.

Thus, to join application functionality to descriptions of look and feel, the developer may use the invention to write look and feel description programs. These visualization and behavior programs will interact with the user interface technology of the computer through operators provided for that purpose. The visualization program will interact with the application functionality through operators created by the developer to interact with components and thereby be joined to the functionality of the objects.

The invention permits and contemplates that components and operators be reusable, and that applications created using the invention be programmed and operated to take advantage of the ease with which an interpretive language can be dynamically augmented with new and modified operators. It is also contemplated that the tools of the invention be used to create applications in which functionality may be dynamically changed and augmented by taking advantage of the tools for dynamically loading operators and components.

From the foregoing summary, it will be clear that the tools and methods of the invention are advantageous over prior art approaches in several ways. First, the invention provides application development tools that allow the user interface of an application to be developed separately from the programming that performs the application-specific tasks.

In addition, the invention provides application development tools that allow the appearance and behavior of the user interface of an application to be readily customized to the requirements of the end user of the application.

In addition, the invention provides application development tools that permit the running application to augment dynamically (i.e., while the program is running) the look or the feel of the application. Furthermore, the invention provides application development tools that permit the look, the feel and/or the functionality of a running application to be dynamically modified without restarting the application.

In addition, the invention provides application development tools in which both the look and the feel of an application may be defined in one file, so that all aspects of the application behavior are controlled by the information contained in that file, even in operating environments such as X that require the separate definition of interface appearance and behavior.

The invention also provides application development tools that permit the domain-specific portion of the application to be designed and implemented without regard to the appearance or operation of a user interface for the application.

These and other advantages of the invention will become more fully apparent when the following detailed description of the invention is read in conjunction with the accompanying drawings.

BRIEF DESCRIPTION OF THE DRAWINGS

FIG. 7 is a conceptual block diagram illustrating elements of a renderings.

FIG. 8 is a conceptual block diagram illustrating the structure of an operating instance of the visualization engine and the operational interrelationships between views, renderings, components, objects and operators.

FIG. 9 is a conceptual block diagram illustrating the structure of an operating instance of the behavior engine.

DETAILED DESCRIPTION OF THE INVENTION

The following description is of the best presently contemplated mode of carrying out the invention. The description is made for illustrating the general principles of the invention and is not to be taken in a limiting sense.

Figure 1:
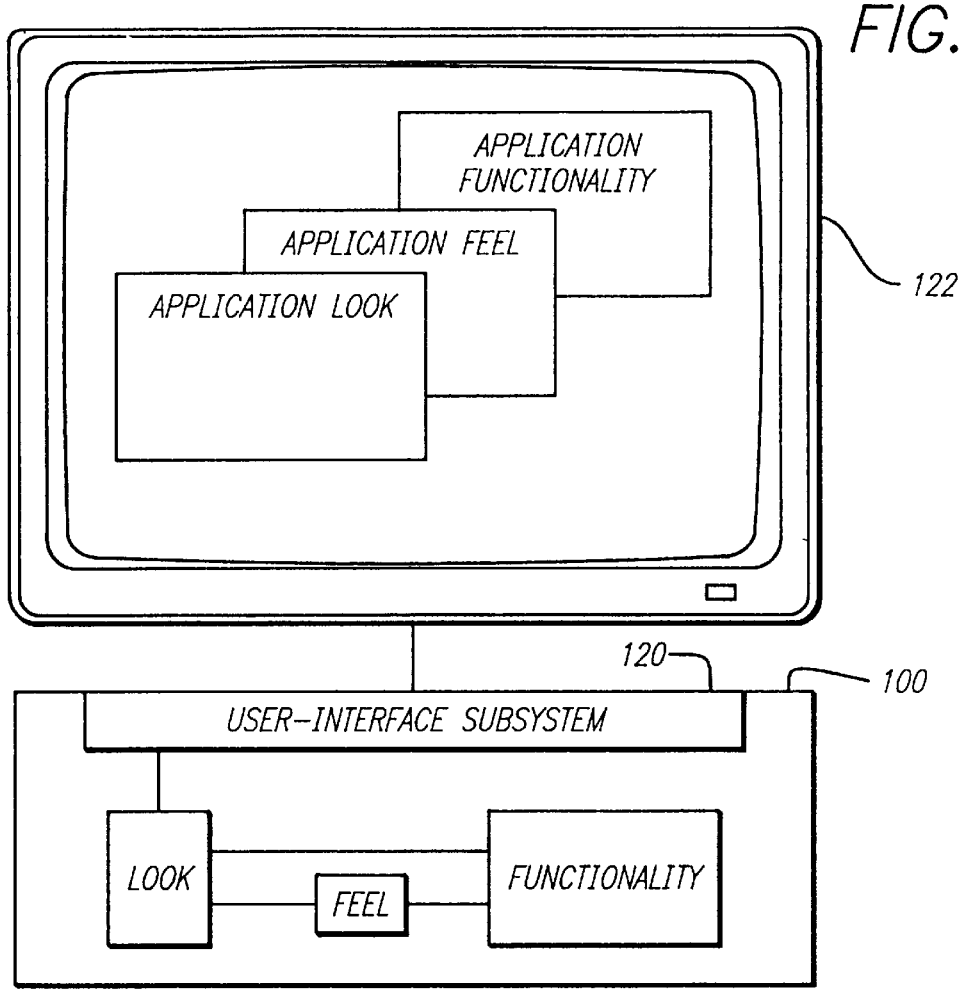
FIG. 1 is a conceptual diagram illustrating the usefulness of the invention to create end-user applications having distinct look, feel and functionality.

Referring to FIG. 1, an embodiment of the present invention will now be described.

In the embodiment, the invention exists in connection with a computer system (not shown) having memory 100 in which computer programs may be executed. The computer system has a user interface subsystem 120 that provides to programs running on the computer system a programmatic way to use a user interface device 122 to interact with a user. An example of such computer systems used in the embodiment are the Integrity series system available from Tandem Computers Incorporated of Cupertino, Calif. having a user interface subsystem 120 comprised of the X and Motif windowing system, which is there implemented to operate generally as described in standard reference works such as R. Scheifler, J. Gettys, R. Newman, *X Window System: C Library and Protocol Reference*, DEC Press 1988, ISBN 1-55558-012-2; P. J. Asente, R. R. Swick, *X Window System Toolkit, The Complete Programmer's Guide and Specification*, DEC Press 1990, ISBN 0-12-972191-6; and Open Software Foundation, *Motif Programmer's Reference*, Prentice-Hall 1990, ISBN 0-13-640517-7.

Figure 2:
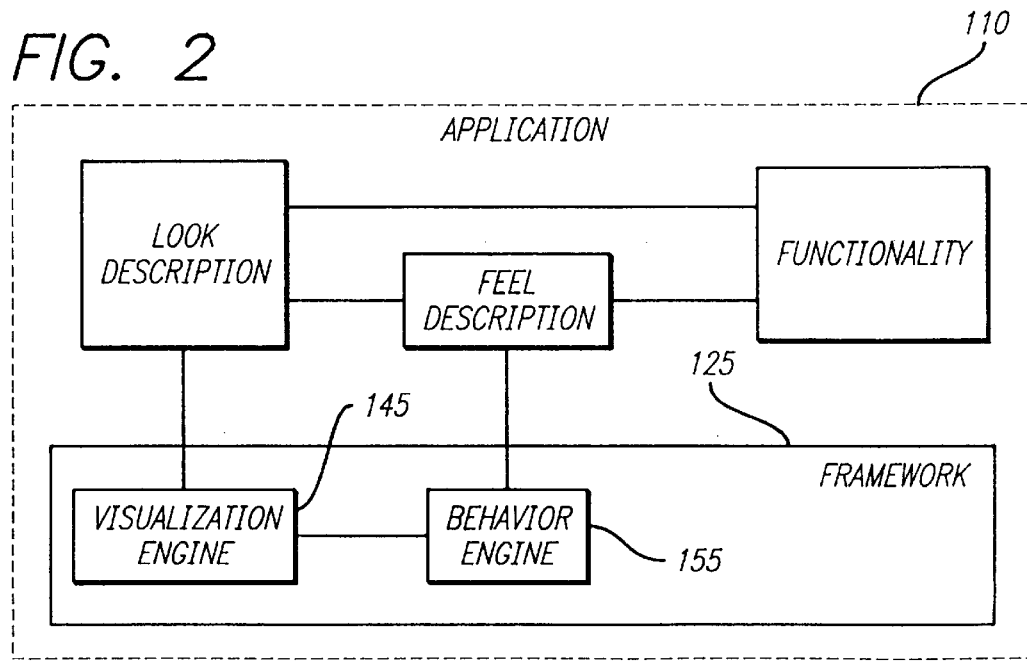
FIG. 2 is a conceptual block diagram illustrating application look, feel and functionality in relation to the tools of the invention.

The invention is intended to be used by a developer to create an application using the methods described in this specification, as illustrated in FIG. 2. Using the tools and methods of the invention, the developer creates a description of the desired look and feel of an application 110. The developer also creates, or adapts from previously existing functional modules, functionality for the application. Then, the developer creates the working application 110 by combining the foregoing elements with the visualization engine 145 and behavior engine 155 of the invention. These engines, along with the application development methods and tools described in this specification, constitute the application development framework 125 of the invention.

In this specification, the terms component, object, operator, rendering and view are used in a way that is specific to this specification. Some of these terms have already been introduced and all are defined in this specification. Other terms, such as class, resource and widget are used in the senses that are conventional in the context of C++, Motif and X programming. (Motif™ is a trademark of the Open Software Foundation, Inc. X Window System™ is a trademark of the Massachusetts Institute of Technology.)

In the embodiment set forth in Appendix A, all the tools of the invention are implemented as computer programs written in the C++ programming language. C++ is implemented and operates generally as described in standard reference works such as B. Stroustrup, *The C++ Programming Language, Second Edition,* Addison-Wesley Publishing Co. 1992, ISBN 0-201-53992-6. An application created in accordance with the foregoing embodiment would operate as a client to an X server (not separately shown, but part of the user interface subsystem 120) operating an X terminal 124.

Views and Renderings

Figure 3:
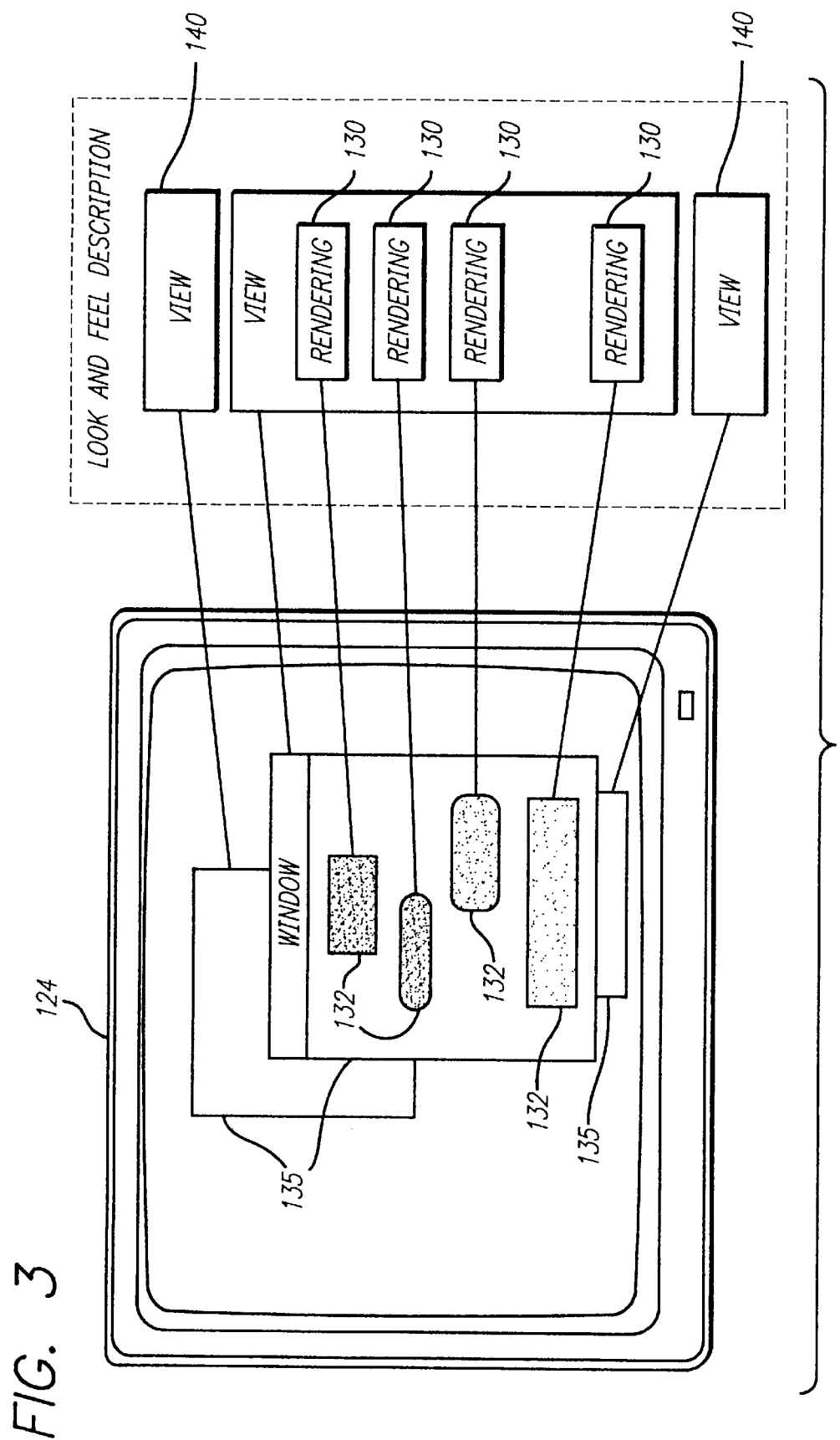
FIG. 3 is a conceptual block diagram illustrating the concepts of view and rendering in the context of a graphical user interface.

Turning to FIG. 3, the concepts of "view" and "rendering" are illustrated, which will be useful for describing the tools and methods used to describe and implement application look and feel.

A rendering 130 exists to create a visualization 132 of a component. It is a basic unit of the description of the look of an application. In a window environment, such as is illustrated in FIG. 3, a rendering would be used to create visualizations 132 of application functionality, in the form of a visualization 132 displayed in a window 135. The developer creates renderings 130 by creating programs in the visualization language which, as already noted, will be interpreted by the visualization engine, all as described below.

A view 140 includes a collection of renderings 130. Like renderings 130, views 140 are described in, and created by, programs written in the visualization language. The purpose of a view is to represent, in the user interface, a collection of information that the developer has decided should be grouped together.

A view will have one or more renderings 130. In a window environment, a view would normally be associated with a window 135, as indicated in FIG. 3.

Components and Objects and Operators

Figure 4:
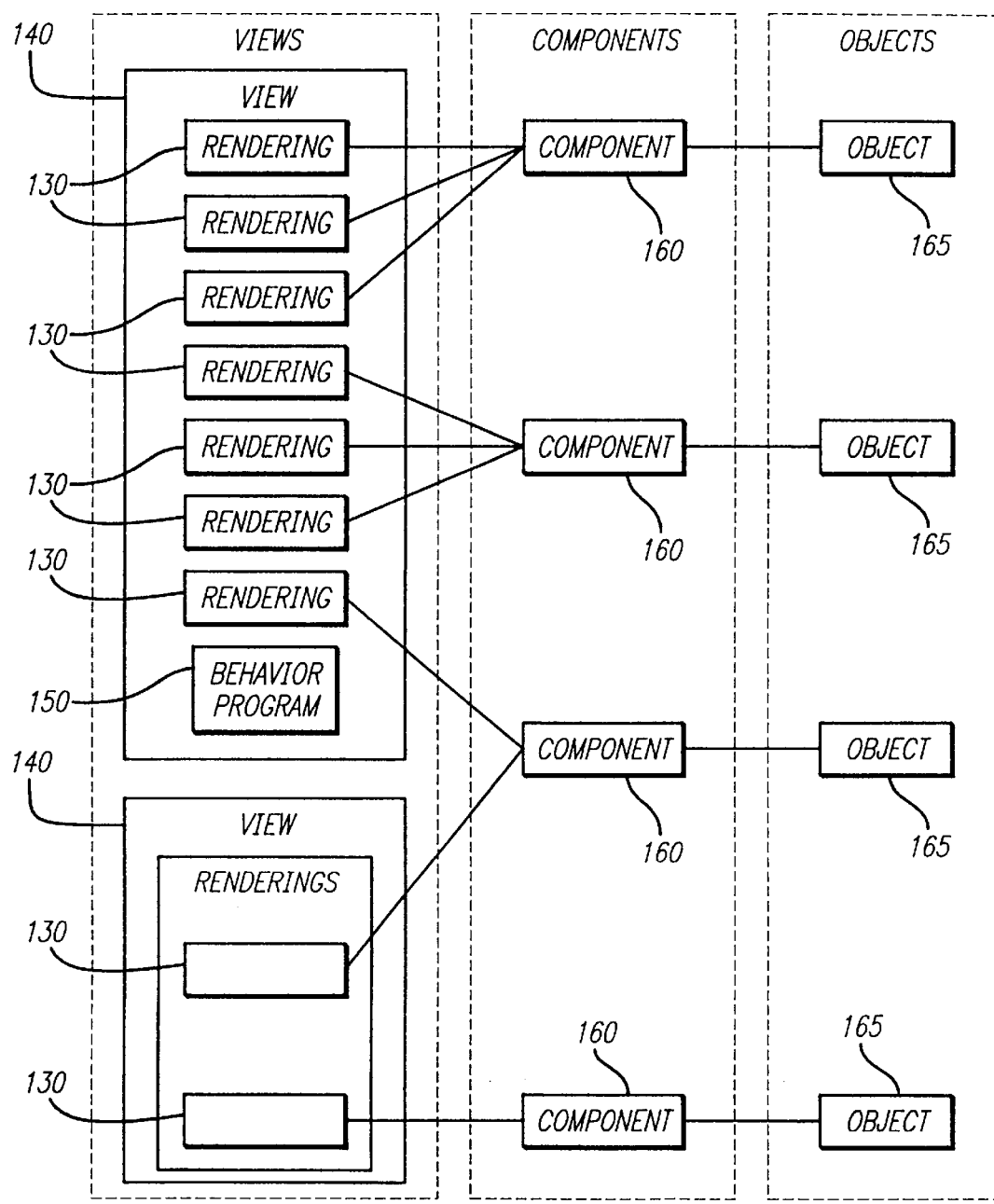
FIG. 4 is a conceptual block diagram illustrating the interrelationship of views and renderings with the elements of application functionality.

In FIG. 4, the relationship between rendering, component and object is illustrated. A component 160 may have associated with it one or more renderings 130. Every rendering 130, on the other hand, is associated with only one component 160.

To join application look to application functionality, each component 160 is joined to (or is made part of) an object 165. An object 165 is a unit of application functionality (i.e., of domain-specific programming). In some cases, an object can be executed on a computer as a self-contained unit. In principle, objects 165 may be created using any of a wide range of computer programming languages, regardless of what particular languages are used to embody the invention.

A component 160 is an abstract representation of its object 165, and contains data and actions associated with its object 165. A component 160 has no visualization associated with it, and if a component's object does have visualization, it is intended that that visualization be disregarded in the operation of the invention. Components 160 need only exist for those objects 165 that will ultimately be manipulated by the user of the application. The determination of what a component 160 represents is application specific, and this determination is implemented when a description of the look and feel of the application, is prepared as explained below.

Figure 5:
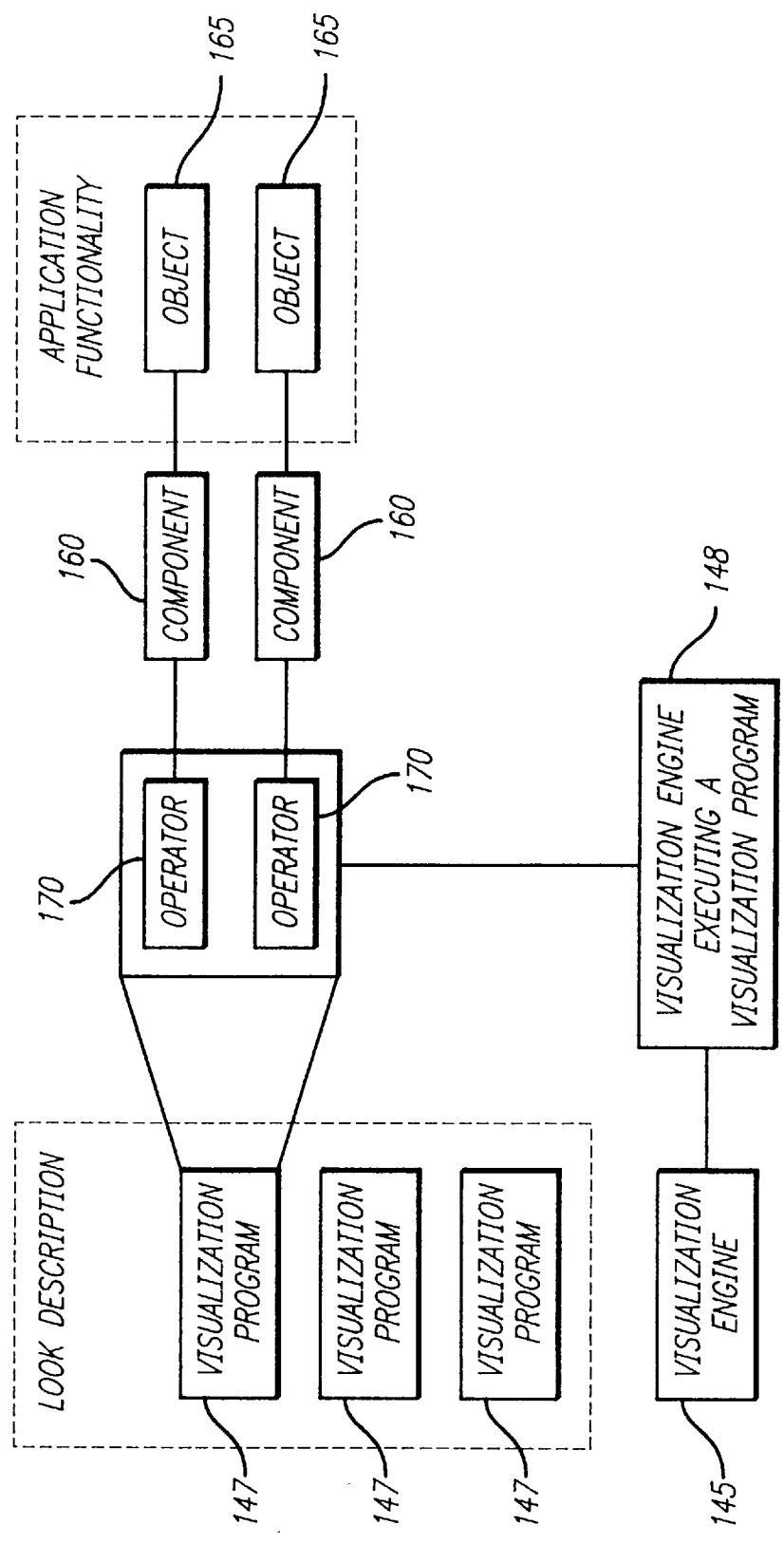
FIG. 5 is a conceptual block diagram illustrating the interrelationship of the elements of the invention in creating application look, feel and functionality.

Turning to FIG. 5, an operator 170 is a syntactic and semantic unit of the visualization language. The developer's visualization programs 147 are written in the visualization language. The visualization engine 145 implements (i.e., interprets or executes) the operators 170 and other elements of the visualization language. An important aspect of the invention is that the visualization engine 145 can load operators 170, both as part of its inherent operation and at the request and under the control of visualization programs 147, permitting the visualization language to be dynamically augmented and changed. In one embodiment, operators 170 are compiled C++ procedures that are loaded out of libraries along with components 160, so that the visualization engine 145 causes the operators 170 to execute on the native computer system.

Figure 6:
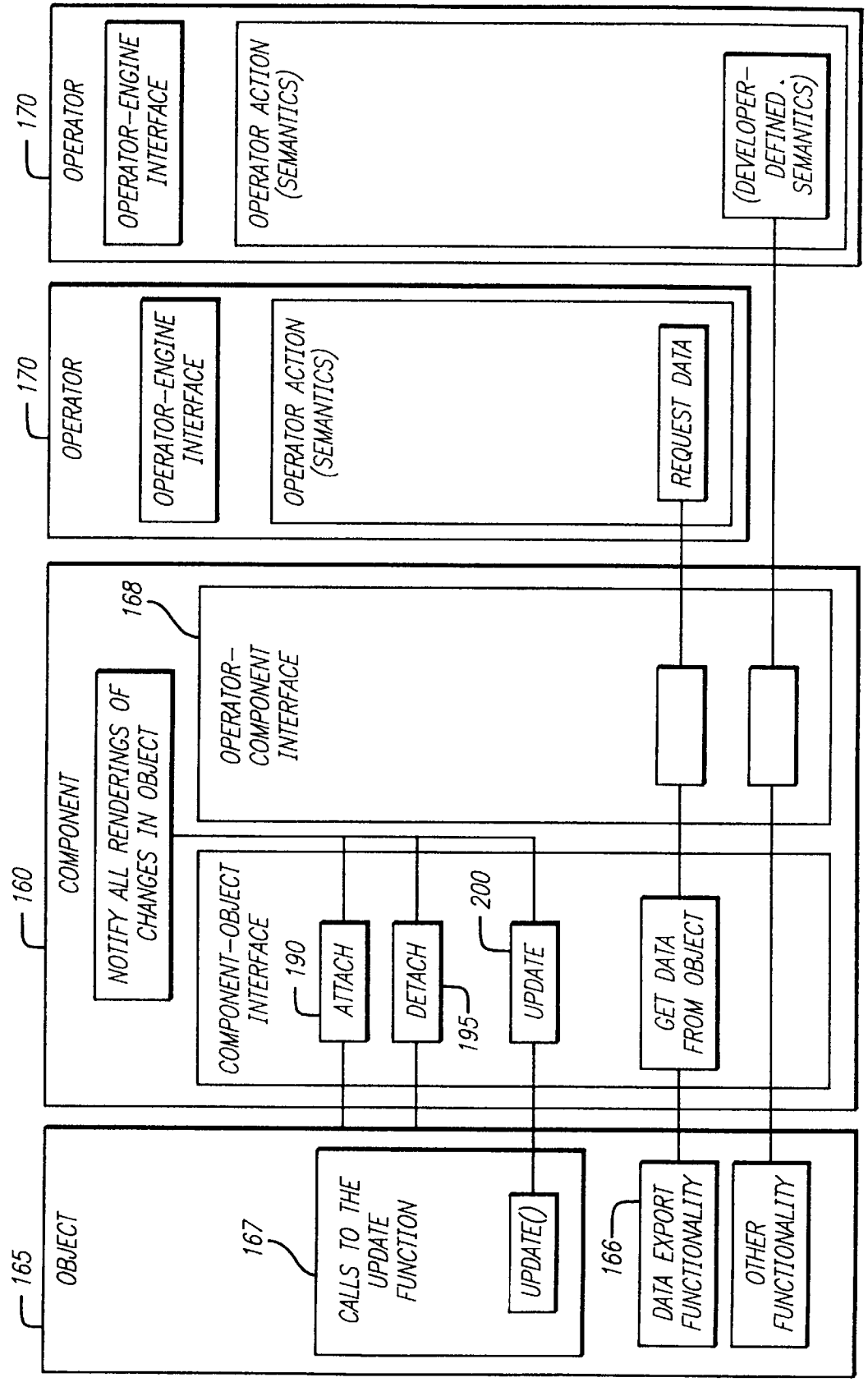
FIG. 6 is a conceptual block diagram illustrating elements of components and operators and illustrating the elements' interrelationships.

These elements are further illustrated in FIG. 6. In a straightforward embodiment of the invention, where components 160 and objects 165 are implemented in compatible languages, an object 165 may be reprogrammed to turn it into a component 160, which merely requires that the object 165 be modified as necessary to present the required programmatic interface 168 to allow interaction with operators 170. In the more general case, an object must be instrumented with two capabilities, as illustrated in FIG. 6. First, the object 165 must be given a data export functionality 166 that (i) defines an association between object variable names for object variables on an export list and (ii) provides an access method that the component 160 can use to obtain values for variables on the export list. Second, the object must be instrumented with calls 167 to a component update function 200, so that the object's component 160 is notified whenever the value of a variable in the object's export list changes.

It is possible and advantageous to implement the components 160 of the invention in such a way that they may be either attached to, or detached from, operators. To support this, the embodiment includes two modules in each component, an "attach" module 190 and a "detach" module 195. It is intended that the appropriate one of the modules be invoked whenever the states of the corresponding component 160 changes. The invocation of these modules will cause the component 160 to notify all renderings 130 attached to the component 160 that a change has occurred in the component's object 165.

It is also possible to implement components 160 and objects 165 in such a way that they operate as separate tasks, possibly running on separate platforms connected by a task-to-task communication facility. In such an embodiment, the "attach" module 190 and "detach" module 195 would normally be implemented in the portion of the component co-resident with the corresponding component operator and the visualization engine, so that the application could be programmed appropriately to show at the user interface changes in the availability of remote application functionality.

The Creation of Renderings and Views

Turning to FIG. 7, a rendering 130 may be created in a running application (that is, a rendering may be instantiated)

as a result of an action performed by a behavior program 150 (actions and behavior programs as described later in this specification) or as the result of a visualization program 147 operator 170. When a rendering 130 is instantiated, a request for attachment to its component 160 is made, and an instance (148 in FIG. 5) of the visualization engine is created, the visualization language update program 136 for the component 160 is saved, the visualization program 137 to be executed when the rendering is not attached to the component is saved, and the visualization program 138 to be executed when the rendering 130 is attached to its component 160 is saved. At the instantiation of the rendering 130, its component 160 is not attached, and the visualization program 137 to be executed when the rendering not attached is executed by the instantiation of the visualization engine 148. Then, if the component 160 of the rendering 130 exists, the component 160 is attached to the rendering 130 and the "rendering attached" program 138 is executed by an instantiation visualization engine 148.

Thereafter, whenever a component is destroyed or created, the rendering-component attachments will be broken or made, resulting in the execution of the appropriate visualization program 147.

Operation of the Behavior and Visualization Engines

In the embodiment, an application is set into operation by starting the visualization engine 145. The visualization engine 145 begins by executing an initial visualization program. A rendering 130 may have one or more visualization programs 147, and each of those visualization programs 147 may, through the operators 170 of the visualization language, create further views 140 and renderings 130.

In the embodiment, in which renderings 130 are not statically linked to components 160, when a rendering 130 is created the visualization engine 147 attempts to locate the corresponding component 160 and attach it to the rendering 130. Initially, the visualization engine 145 executes the rendering's "component detached" visualization program 137. Then, if the component was successfully attached to the rendering, the "component attached" visualization program 138 is executed. If, at a later time, the component's object notifies the component of a change in an object variable on its export list (by calling the component's update function 200), or if the component later becomes detached from the rendering 130 (for example, if the component terminates its operation or has its operation terminated), the corresponding visualization programs 147 associated with the rendering will be executed by the visualization engine 145.

As previously noted, in the embodiment each of the visualization and behavior engines is an interpreter. In order to operate in interaction with asynchronous events, such as callbacks from the user-interface subsystem, each visualization program is executed by an instance of the visualization engine. That is, as illustrated in FIGS. 5 and 8, when a visualization program is to be executed, the visualization engine is instantiated 148 with a copy of, or reference to, the static code of the visualization engine, with a new context, and with a copy of, or reference to, the visualization program 147 to be executed. Thus, it is expected that visualization programs 147 will be transient in their execution.

Similarly, as illustrated in FIG. 9, behavior programs are executed by similarly instantiating the behavior engine.

The PostScript/C++ Embodiment

In the embodiment implemented as shown in Appendix A, the visualization language is an extension of the PostScript® language. (PostScript is a registered trademark of Adobe Systems Incorporated of Mountain View, Calif.) The PostScript language is described in Adobe Systems Incorporated, *PostScript Language Reference Manual,* Addison-Wesley Publishing Co. 1985, ISBN 0-201-10174-2. The extensions of the embodiment are set forth in detail later in this specification. Generally, the extensions provide operators 170 that allow the developer to program interactions with the user interface subsystem 120, that allow the developer to programmatically create views 140 and renderings 130, and that allow the developer to augment the visualization language by adding developer-defined operators 170 to the language, including operators that provide semantics specific to particular components.

In the embodiment, components 160 are C++ modules created as derived classes of the class Component. This base class defines member functions to perform the basic interactions with operators executed by the visualization engine 145. A developer, in creating new components 160 and new operators 170 interacting with the new components 160, will likely create additional member functions in the derived classes. The member functions of the base class Component will be described later in this specification.

In the embodiment, an object written in C++, or contained within a C++ wrapper, is instrumented and linked to its component 160 as follows. If the original object cannot be linked as a C++ or C module, the developer will first embed the object in a C++ wrapper, which is considered part of the object. The developer creates a Component derived class to link to the object, and the derived class is defined to have member functions that can be called from visualization language operators to invoke the functionality of the object. In the derived class, the developer also defines an export list to refer to the contents of the object. The export list maps variable names to addresses: the variable names are taken as names of data items in the object and the addresses as the memory address says within the object where the corresponding data items are found. The export list is used when a visualization language operator uses a variable name to refer to a data item in a component. In conjunction with defining the export, the developer also modifies the object, so that the derived class's member function updates is called whenever the value of a data item in the export list changes.

After components have been created, they must be stored so as to be available to the operators of the visualization engine. In the embodiment, this is done by storing components and objects in libraries as compiled code.

The PPS Behavior Language

In the embodiment, the behavior language used to describe the interactive behavior of the user interface is a propositional production system ("PPS"), as described D. R. Olsen, "Propositional Production Systems for Dialog Description", ACM CHI '90 Proceedings 57–63 (Assoc. for Computing Machinery, April 1990).

A propositional production system has a state space definition and a set of rules. A state space has a set of conditions, which are grouped in fields with all conditions in a given field being mutually exclusive. Rules transform one state in the state space into another. A rule consists of a left hand side (the conditions) and a right hand side (the consequence). The left hand side is a set of conditions that must be present in the current state for the rule to fire, and the right hand side is the conditions that will be asserted in the next state.

When a condition is asserted, the semantic action or actions associated with the condition will be performed.

When a PPS is properly defined, the actions attached to conditions belong to different fields are independent of each other and therefore may be invoked simultaneously or in any order without risk of conflict. In the embodiment, semantic actions are visualization programs 147 that the behavior engine 155 passes to the embodiment, which creates an instance of the visualization engine 145, and the visualization engine instance 145 then executes the action program.

To enable the application to change the appearance of menu items depending on what input is acceptable, each input field must have a semantic disable action associated with it that can be called for each field condition that is not acceptable as input, and semantic enable action, to reverse the effect. This is a simple example of the use of PPS to express the feel of an application.

Generally, some fields will be set by the application in which the PPS is embedded (in the embodiment, this is generally done in visualization programs) to set the state of the PPS. Fields defined for this purpose, which do not appear in the right hand side of any rule, are called semantic fields, and contain the semantic memory of the PPS.

A PPS may also have query fields, which contain conditions that are evaluated by requesting information from outside the PPS, generally from the user. Each query field has an associated query action that is executed when, and only when, the field's condition is needed whether a rule can fire.

Similar to the ability of the visualization language described above to incorporate new operators, a PPS can be extended by inheritance, which allows new rules to be added and new fields to be defined, as long as inherited conditions do not appear in the right hand side (the consequence) of a new rule. This restriction prevents new rules from changing the behavior of the previously defined PPS The methods for executing a PPS are described in the Olsen paper cited above. These methods are generally implemented in the embodiment as described, with the following caveat: under an X window system, one cannot stop the system to wait for a query response.

The Visualization Language Extensions

As already noted, in the embodiment the PostScript language is the basis of the visualization language. The new operators that make up the visualization language extension of the invention are set forth below. They are defined with their PostScript language syntax and semantics in the conventional way.

<widget> <view name> <stateSpaceName> <ruleSetName> NewView <view>

This operator creates a view with the widget <Widget> and name <view name>, and associates with the new view the state and rule definitions making up the PPS behavior program for the view.

<view> <client data> <widget> <detach code> <attach code> <update code> <component name> NewRendering <rendering ID>

This operator is used to create a new rendering and connect it to the component named in <component name>. The operands <view>, <client data>, <widget> and <component name> are used as data when the visualization programs <detach code>, <attach code> or <update code> are executed, which occurs whenever this rendering is informed that its associated component is detached, is attached or has changed, respectively. The operands are accessible by the operator GetUpdateData.

<client data> <postscript callback code> <callback name> <widget> XtAddCallback

This operator arranges for the code contained in the operand <postscript callback code> to be interpreted on the Xt callback in the operand <callback name> for the widget <Widget>. The data in the operand <client data> is used in the operator GetCallbackData.

GetCallbackData <widget> <client data> <a callback data>

This operator gets the callback data from X. The only use of this operator is inside of the visualization language program designated as the callback program. This operation is described in the description of XtAddCallback in standard X and Xt reference material.

<widget> <Subpart class name> <Subpart name> <Resource class name> <Resource instance name> GetSubString <string>

This operator fetches a string from the subresources associated with the widget <widget>. This function is described in standard X and Xt reference material.

GetUpdateData <client data> <widget> <component name>

This operator gets the update data associated with a rendering. The only use of this operator is inside of visualization language code designated as the postscript update code for a particular rendering. This operator produces three results.

<widget name> <root widget> NameToWidget <widget>

The operator is used to convert a name to a widget ID. The operator <name> is an ASCII string that is the name of a widget. The result <widget> is the widget ID of the found widget.

<widget> <instance name> PostscriptCode <postscript code>

This operator is used to obtain visualization language code from the following Xt subresources:
XgNmacros XgCMacros XtRString
XgNcode XgCCode XtRString
This operator looks for the subresource for the widget <widget> with the subresource instance name of <instance name>.

<widget> ViewToWindow <window ID>

This operator returns the Window ID <window ID> for the widget operand that was passed in when NewView created the <view>.

<field name> <component> GetCVariable <status> <value>

This operator gets the <value> of the data item known to the <component> by the name <field name> using the export list.

<widget> <view> ViewSetMainWindow

This operator associates a widget (or a window) with a view.

<view> ViewSuspendProcessing

This operator suspends processing of the PPS engine. This is important, for the sake of efficiency, to prevent the PPS from being run each of the many times a new rendering is created at the beginning of an application.

<view> ViewResumeProcessing

This operator is the counterpart of ViewSuspendProcessing.

PopObject <any>

This operator will pop data off the PostScript stack of the prior instantiation of the PostScript visualization program.

<name> <command> <postscript code> SubProcess

This operator creates an instantiation of the PostScript visualization engine to execute the PostScript operand.

GetSubProcesStatus <status> <name> <output>
This operator returns the status of a PostScript subprocess initiated with the SubProcess operator.

<Xg event name> <window ID> XgSendXgEventToWindow <status>
This operator is used to send an event to a window to allow for interprocess communication among views.

<Xg event name> <view> XgSendXgEvent <status>
This operator performs the same function as does XgSendXgEvent.

<action> <Xg event name> <view> ViewRegisterAction
This operator specifies the PostScript <action> to be executed when an event of <Xg event name> is received by the <view>.

<libname> <version-number> LoadSharedLibrary <status>
This operator dynamically loads a library that may include components, objects and operators.

GetXtTimerData <client data> <timer ID>
This operator is used to get Xt timer data when the PostScript visualization program is executing as a result of an Xt timer callback.

<widget name> <parent widget> XgCreatePostscript <widget>
The purpose of this operator is to create a widget whose only use is to allow the PostScript visualization language to be used to draw into a window with the native PostScript operators.

<X callback data> <field name> XmToggleButtonCallbackStruct <any>
This operator pulls out a field from the Motif XmToggleButtonCallbackStruct and returns it as the result <any>. The operand <X call back data> is the result from the operator GetCall backData. The operand <field name> may be limited to the string "set".

<color name> ColorNameToPixel <pixel>
This operator converts the string operand <color name> to the int result <pixel>.

<widget> <resource name> Cluster <cluster ID>
This operator creates a cluster. A cluster, also called cluster boxes, is used collect a number of strings together, to concatenate them, with no guaranteed order, and then set a resource in a widget. The result <cluster ID> is used to identify a cluster in the ClusterSet operator.

<boxname> <string> <cluster ID> ClusterSet
This operator sets a particular cluster box with a string value, concatenates all of the cluster boxes and sets the resource for the widget as specified in the operator Cluster. The cluster box is specified by an arbitrary string in the operand <string>. The string to be placed in that cluster is from the operand <string>. The cluster ID is specified in the operand <cluster ID>.

<background color> <foreground color> <pixmap name> <screen> XmGetPixmap <pixmap ID>
This operator creates a Motif pixmap. The operands <background color> and <foreground color> are converted to Pixel values, as discussed in the operator ColorNameToPixel. The string operand <pixmap name> is used as the name of the pixmap, as specified for the Motif procedure XmGetPixmap. The result <pixmap ID> identifies the newly created pixmap.

<widget name> <parent widget> XmOPerator <widget>
The operators listed in the table below (generically, XmOperator) are used to create Motif widgets. The operand <widget name> is the name of the new widget as an ASCII string. The operand <parent widget> is a widget, either a string or an int. If <parent widget> is a string, the function XtNameToWidget() is used to find the named widget. The result <widget> is the widget ID for the newly created widget.

| | |
|---|---|
| XmCreateArrowButtonGadget | XmCreateBulletinBoard |
| XmCreateBulletinBoardDialog | XmCreateCascadeButton |
| XmCreateCascadeButtonGadget | XmCreateCommand |
| XmCreateDialogShell | XmCreateDrawingArea |
| XmCreateDrawnButton | XmCreateFileSectionBox |
| XmCreateFileSelectionDialog | XmCreateForm |
| XmCreateFormDialog | XmCreateFrame |
| XmCreateLabel | XmCreateLabelGadget |
| XmCreateList | XmCreateScrolledList |
| XmCreateMainWindow | XmCreateMenuShell |
| XmCreateMessageBox | XmCreateMessageDialog |
| XmCreateErrorDialog | XmCreateInformationDialog |
| XmCreateQuestionDialog | XmCreateWarningDialog |
| XmCreateWorkingDialog | XmCreatePanedWindow |
| XmCreatePushButton | XmCreatePushButtonGadget |
| XmCreateRadioBox | XmCreateRowColumn |
| XmCreatePopupMenu | XmCreatePulldownMenu |
| XmCreateOptionMenu | XmCreateMenuBar |
| XmCreateScale | XmCreateScrollBar |
| XmCreateScrolledWindow | XmCreateSelectionBox |
| XmCreateSelectionDialog | XmCreatePromptDialog |
| XmCreateSeparatorGadget | XmCreateSeparator |
| XmCreateText | XmCreateScrolledText |
| XmCreateToggleButton | XmCreateToggleButtonGadget |

Similarly, the following operators correspond, in agreement and meaning, the corresponding Motif functions of the same name.

<string> XmString <XmString>
<item> <position> <widget> XmListAddItem
<position> <widget> XmListDeletePos
<widget> XmMainWindowSep1 <widget>
<widget> XmMainWindowSep2 <widget>
<main window widget> <menu_bar> <command_window> <horiz. scrollbar> <vert. scrollbar> <work region> XmMainWindowSetAreas <state>
<notify> <widget> XmToggleSetState The semantics of the foregoing operators is described in standard Motif reference material The following operators correspond, in argument and meaning, the Xt functions of the same name.

<widget name> <parent widget> XtCreateApplicationShell <widget>
<widget> <resource name> <any> XtGetValue <value>
<widget> XtParent <parent widget>
<widget> XtPopupGrabNone
<widget> XtRealizeWidget
<widget> XtScreen <screen>
<all or none> XCreateColormap <cmap>
<value> <widget> <resource name> XtSetValue
<widget> XtDestroyWidget
<widget> <resource name> XtGetShortValue <result as number>
<Widget> <Boolean> XtSetSensitive
<widget> ViewToWindow <window ID>
<widget> XtWindow <window ID>
<client data> <postscript action> <interval> <view> XtAddTimeOut <status>

The semantics of the foregoing operators is described in standard X reference material.

The Component Class Member Functions

As previously noted, components may be created as derived classes of the base class Component, whose member functions are specified in the embodiment as follows.

Component<char *name>

The class Component has two forms of constructor. This form constructs a Component object and places a pointer to itself in the static List components. The argument name is to be the component name of the new component, and is assigned to the instance variable __componentName. This component can then be referenced by its name.

virtual void update()

This member function is called to notify the renderings attached to the component that a change has occurred in the component's object that may be important to the rendering. Typically, update() is called when an instance variable that a rendering uses has changed value. The update() member function is called for each rendering attached to the component.

virtual char *componentName() const;

Returns a char* pointing to an ASCII string representing the name of this component.

static Component *find(char *name)

Find and return a pointer to the component with the component name of name.

char *__componentName;

This instance variable points to the ASCII characters used as the component name.

List<Renderings> renderings;

This is a list of all of the instances of the class Rendering associated with this Component. This list is used by the constructor(s) for the class Rendering. In addition, Component uses this list to for the update() member function.

static List <Component> components;

This list contains all of the instantiated Components as placed by the constructors.

Summary and Conclusion

The invention provides tools and methods for a developer to use to create an application having look, feel and functionality. To create an application, the developer describes the look and the feel of the application by creating programs in an interpretive visualization language and behavior language. As to the functionality, the developer may begin with pre-existing programs that have the necessary functionality, or the developer may create functional program modules. The developer will then modify and augment the functional modules to create components, which have the appropriate interface to be used with visualization and behavior language programs.

For the purpose of joining functionality to look and feel, the developer creates a set of operators that will augment the operator set of the visualization and behavior languages. The developer-created operators may be used for any purpose, but the developer will create at least a set of operators to obtain data from, and control the operation of, the functional modules to be included in the application. The developer will then use the developer-created operators as elements of the visualization and behavior languages when creating the programs that describe the look and feel of the application.

The developer puts the application together by joining the look and feel programs, the functionality modules and the visualization and behavior engines, which will execute the look and feel programs and thereby set the application into operation.

In describing the embodiment, a number of specific technologies used to implement the embodiment of various aspects of the invention were identified and related to the more general terms in which the invention was described. Also, in describing details of the implementation of the embodiment, clarity and brevity have required that the description be in terms of the specific identified technologies. However, it should be understood that such specificity is not intended to limit the scope of the claimed invention.

The foregoing description of the invention has been presented for purposes of illustration and description in conjunction with the Appendices attached hereto. The above description is not intended to be exhaustive or to limit the invention to the precise form disclosed, and many modifications and variations are possible in light of the teaching without deviating from the spirit and scope of the invention. The embodiment chosen and described is selected to best explain the principles of the invention and its practical application to thereby enable others skilled in the art to best utilize the invention in various embodiments and with various modifications as suited for the particular purpose contemplated. For example, a wide range of commercially available hardware and component substitutes can be used in lieu of those described above. It is intended that the scope of the invention be defined by the claims appended hereto.

Working Example

Turning to Appendix B, the use of the embodiment of the invention presented in this specification is illustrated by a working example. The example is an application called AWB (Administrator's Workbook), which allows its user to obtain information from, and to control, a number of different kinds of host computers on a network. A component is defined for each kind of host computer, with a corresponding PostScript operator for the execution by the visualization engine.

The first file in Appendix B, Imakefile, v 1.7, is used to creat a loadable shared library of objects for the four kinds of host computers supported: Guardian, Helix, S2 and Sun. The files following in Appendix B define the components and operators for the application, namely:

| File | Operator |
| --- | --- |
| Host.h | (None, this defines the parent |
| Host.C | class) |
| GuardianHost.h | |
| GuardianHost.c | <host names> GuardianHosts - |
| HelixHost.h | |
| HelixHost.C | <host names> HelixHosts - |
| S2Host.h | |
| S2Host.C | <host names> S2Hosts - |
| SunHost.h | |
| SunHost.C | <host names> SunHosts - |

There follows in Appendix B a file called awbInitPackage.c, which contains a program that will automatically be invoked as part of the process of loading a shared library, which is done by the LoadSharedLibrary PostScript operator. There is then in Appendix B a file called Imakefile.c, v 1.9, which contains the program that creates application from the programs in the files.

There is finally, in Appendix B, the application file itself, called awb.imf, the contents of which are described in the following paragraphs.

awb.imf is a resource file in standard X windows format, and it defines a view. The file is passed through a preprocessor before installation into the user environment in order to process the contents of various macro calls. Macros are identifiable in the source code by their use of all upper case letters.

Lines 1–20 (all line references are to lines in the file awb.inf) are basic setup, common to all views.

Lines 22–29 are executed whenever a subprocess terminates. AWB (the application) will have started the subprocess in response to a push on an armed tool button.

Lines 30–43 are a precaution to prevent execution errors.

Lines 45–117 are the PPS rules for AWB. For example, rule 7 says "if you are in state interfaceStateControl and an S2 host has been selected and the PowerViewAction button is selected, then perform the performPowerView action and change from the interfaceStateControl to the interfaceStateAction states". This rule reads:

| *ruleSet.7.lhs: | interfaceStateControl |
| | S2HostSelected powerViewAction |
| *ruleSet.7.rhs: | performPowerView |
| | interfaceStateAction |

Lines 119–253 are the code that is executed when the AWB view is initialized. In particular, lines 120–125 print a notification message and create the basic window object/action areas and line 125 initializes a shared-dictionary which is used by AWB to store important variables;

127–136 define a macro called GetPixmap, which computes and retrieves a graphics pixmap for a particular host machine;

138–152 define a macro called GetAWBPixmaps which gets all the pixmaps for the various machine states and stores them in a dictionary;

154–171 create the main window and standard decorations (menu bars, etc.);

173–183 create the buttons (actions) that correspond to the tools available in AWB;

185–197 define a macro called CreateS2Hosts, which creates each button for each of the S2 hosts defined (later on) in the resource file;

199–211 do the same for S2/Helix machine types;

213–225 do the same for Guardian machine types;

227–239 do the same for Sun machine types;

241–247 define the machines that this version of AWB can manage;

249 sets the initial condition of PPS to "interfaceStateControl", which means that users may select hosts and actions (see PPS rules);

251 resumes the PPS engine (which had been suspended); and 253 ensures that all graphics are visible and user events are processed.

Lines 255–292 establish some defaults for the look of AWB.

Lines 295–308 contain PostScript code that is executed whenever a component is detached. In this case, the rendering is set insensitive (unresponsive to user input) and a special pixmap is displayed to reflect this.

Lines 310–319 contain PostScript code that is executed whenever a component is detached.

Lines 321–352 define some resources that are common to all machine buttons in the object work area.

Lines 354–380 contain PostScript that is executed whenever a machine button (object) is selected. The button must be sensitive (i.e., not disabled) for this to occur.

Lines 382–399 contain PostScript code that is executed whenever an action button is pressed. This button must be sensitive for this to occur.

Lines 401–447 define some resource values for the various action buttons.

Lines 449–506 are more defaults, with the addition of some PostScript code to execute when the button is pressed. For example, the code in lines 452–456 is executed whenever the user selects the "Help on the Integrity Systems Manager" entry in the Help menu. Lines 487–506 are executed during the construction of a new view in order to give the user some feedback during this lengthy process.

Lines 508–516 define PPS semantic conditions.

Lines 522–544 are code that is executed when the interfaceStateAction condition is asserted by PPS (for example, when the user selects a host and presses on the power button while in the interfaceStateControl state).

Lines 546–557 are code that is executed when an error is detected while trying to start a new view. Lines 559–562 contain defaults related to this.

Lines 576–588 define the performActions conditions. These are asserted by pressing on a tool (action) button.

Lines 590–668 are the code associated with pressing an action button. For example, lines 622–623 are the code that is executed in order to bring up the power view.

Lines 671–683 define the PPS semantic fields that identify which, if any, host is selected.

Lines 686–701 define the PPS input fields.

Lines 703–789 are the code that is executed when the various input fields are enabled and disabled. In most cases, this simply sensitizes or desensitizes the button.

Lines 792–798 are some final resource defaults to do with the information dialog constructed during processing of a new view and with an unwanted option (legend Area) on the screen.

The AWB application, then, works as follows. When the view is started, the code in the "View Initialization" section is executed. This creates the main window, gives it decorations, such as a menu bar; title, object and action areas; and buttons. This also sets the interfaceStateControl semantic condition.

If the user selects (presses on) a host machine (an object in the object area), the code in lines 354–380 is executed and sets a new pixmap (for either the selected or unselected state: these are toggle buttons, press once to turn "on" and again to turn "off") and sets a new semantic condition for the given system type (S2HostSelected, SunHostSelected, and so on).

The user's selecting a host machine will enable the corresponding input fields, i.e., the ones that could possibly fire if their input conditions were true. The effect will be that all possible actions for the selected machine type will have their enable code executed (lines 703–789). If the user selects a different machine type, the PPS code will capture the new machine type (lines 354–380) and disable the newly ineffective buttons and enable the newly effective ones.

If the user presses on action button, the semantic condition associated with that action type (defined in lines 173–183) is asserted. The PPS engine will now have enough asserted conditions to fire one of the left-hand-side (lhs) rules in lines 45–117 and the appropriate action will take place. If the user's selection causes a new view to be created, some intermediate states (rules 21–24, lines 107–117) may be asserted with corresponding actions.

List of Appendices

Appendix A—Microfiche copy of source code for Extensible Framework for Graphical Application.

This appendix is the source code for an embodiment of the systems and methods of the present invention.

Appendix B—Microfiche copy of Source Code for Extensible Framework, Working Example.

This appendix is the source code for an application created using the systems and methods of the present invention, which is presented as a working example.

What is claimed is:

1. A method, comprising the steps of:

providing an application having functional modules;

defining look of the application with a visualization program having a first set of operators each prescribing interaction of the application look with the functional modules;

separately defining feel of the application with a behavior program having a second set of operators each prescribing interaction of the application feel with the functional modules;

creating components of the application to associate with the functional modules, each component prescribing interaction of a corresponding functional module with predetermined operators; and joining the application look and feel to the functional modules of the application by attaching predetermined operators of the visualization program and behavior program to the components of the functional modules.

2. The method of claim 1, further comprising the steps of:

creating a new operator for the visualization program; and loading the new operator into the application.

3. The method of claim 2 wherein the step of loading is performed during runtime of the application.

4. The method of claim 1, further comprising the steps of:

creating a new operator for the behavior program; and loading the new operator into the application.

5. The method of claim 4 wherein the step of loading is performed during runtime of the application.

6. The method of claim 1, further comprising the step of modifying a predetermined operator of at least one of the visualization program and behavior program.

7. The method of claim 1, further comprising the step of modifying the component of a predetermined functional module of the application.

8. The method of claim 1, further comprising the steps of:

creating a new functional module;

creating a new component to associate with the new functional module; and loading the new component into the application during runtime of the application.

9. The method of 8, further comprising the steps of:

creating a new operator for the visualization program;

loading the new operator of the visualization program into the application; and attaching the new operator of the visualization program to the new component of the new functional module during the runtime of the application.

10. The method of claim 8, further comprising the steps of:

creating a new operator for the behavior program;

loading the new operator of the behavior program into the application; and attaching the new operator of the behavior program to the new component of the new functional module during the runtime of the application.

11. The method of claim 1, wherein the application is a pre-existing program.

12. The method of claim 1, further comprising the steps of:

using a first interpreter to execute the visualization program defining the look of the application; and using a second interpreter to execute the behavior program defining the feel of the application.

13. A system for running an application program having functional modules, comprising:

means for defining look of the application with a visualization program having a first set of operators, each operator in the first set prescribing interaction of the application look with the functional modules;

means for defining feel of the application with a behavior program having a second set of operators, each operator in the second set prescribing interaction of the application feel with the functional modules;

means for creating components to associate with the functional modules, each component prescribing interaction of a corresponding functional module with predetermined operators; and means for attaching predetermined operators of the visualization program and behavior program to the components of the functional modules so as to join the application look and feel to the functional modules of the application.

14. The system of claim 13 wherein the means for defining look includes means for allowing alterations to the first set of operators during runtime of the application program so as to add new look to the application program.

15. The system of claim 14 wherein the alterations to the first set of operators include addition and deletion of operators to and from the first set of operators.

16. The system of claim 13 wherein the means for defining feel includes means for allowing independent alterations to the second set of operators during runtime of the application program so as to add new behavior to the application.

17. The system of claim 16 wherein the alterations to the second set of operators include addition and deletion of operators to and from the second set of operators.

18. The system of claim 13 wherein the means for creating components includes means of allowing alterations to the components during runtime of the application program so as to add new functionality to the application program.

19. The system of claim 18 wherein the alterations include addition and deletion of functional modules and associated components.

20. The system of claim 13, further comprising:

a first interpreter that executes the visualization program defining the look of the application; and a second interpreter that executes the behavior program defining the feel of the application.

* * * * *